United States Patent
Phelan et al.

(10) Patent No.: US 6,738,018 B2
(45) Date of Patent: May 18, 2004

(54) ALL DIGITAL PHASED ARRAY USING SPACE/TIME CASCADED PROCESSING

(75) Inventors: H. Richard Phelan, Palm Bay, FL (US); Mark L. Goldstein, Palm Bay, FL (US); G. Patrick Martin, Merrit Island, FL (US); Richard J. Nink, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/136,673

(22) Filed: May 1, 2002

(65) Prior Publication Data

US 2003/0206132 A1 Nov. 6, 2003

(51) Int. Cl.[7] ................................................. H01Q 3/26
(52) U.S. Cl. ....................... 342/373; 342/157; 342/368; 342/380
(58) Field of Search ............................... 342/157, 368, 342/373, 378–384

(56) References Cited

U.S. PATENT DOCUMENTS

| | | | | |
|---|---|---|---|---|
| 5,396,256 A | * | 3/1995 | Chiba et al. ............... | 342/372 |
| 5,493,307 A | * | 2/1996 | Tsujimoto ................... | 342/380 |
| 5,600,326 A | * | 2/1997 | Yu et al. ...................... | 342/17 |
| 6,061,023 A | * | 5/2000 | Daniel et al. ............... | 342/354 |
| 6,075,484 A | * | 6/2000 | Daniel et al. ............... | 342/372 |
| 6,345,188 B1 | * | 2/2002 | Keskitalo et al. ........... | 455/561 |
| 6,480,154 B1 | * | 11/2002 | Bella et al. ................. | 342/372 |
| 6,509,865 B2 | * | 1/2003 | Takai ........................... | 342/158 |
| 2002/0080066 A1 | * | 6/2002 | Dent ............................ | 342/373 |
| 2002/0180639 A1 | * | 12/2002 | Rickett et al. .............. | 342/372 |
| 2002/0190901 A1 | * | 12/2002 | Yoshida ....................... | 342/383 |
| 2003/0020646 A1 | * | 1/2003 | Yu ................................ | 342/17 |

FOREIGN PATENT DOCUMENTS

| | | | | |
|---|---|---|---|---|
| JP | 11251986 A | * | 9/1999 | ............ H04B/7/10 |

OTHER PUBLICATIONS

Artical entitled "Transmitting Null Beam Forming With Beam Space Adaptive Array Antennas" by Isamu Chiba et al. in IEEE (1994).*

(List continued on next page.)

*Primary Examiner*—Thomas H. Tarcza
*Assistant Examiner*—Isam Alsomiri
(74) *Attorney, Agent, or Firm*—Sacco & Associates, P.A.

(57) ABSTRACT

The invention concerns a method and apparatus for cascaded processing of signals in a phased array antenna system in which a plurality of antenna elements are configured as a plurality of sub-arrays. A weighting factor is applied to each of the antenna elements to form a plurality of sub-array beams, each pointed in a selected direction. For each sub-array, an output from each the antenna elements in the sub-array can be combined to produce a sub-array output signal. The sub-array output signals are selectively weighted and combined in a fully adaptive process. Subsequently, the system can estimate an angle-of-arrival direction for a signal-of-interest ("SOI") and at least one signal-not-of-interest ("SNOI"). Based on this estimating step, the system calculates a new set of weighting factors for controlling one or more of the sub-array beams to improve the signal-to-noise plus interference ratio obtained for the SOI in the array output signal.

28 Claims, 4 Drawing Sheets

OTHER PUBLICATIONS

Artical entitled "Experimental Studies of Space–Divison–Multiple–Access Schemes for Spectral Efficient Wireless Communications" by G. Xu et al. IEEE (1994).*

Artical entitled "Beamforming Experiment with a DBF Multibeam Antenna in a Mobiel Satellite Enviorment" by Miura, Ryu . IEEE Transaction on Antennas and Propagation, vol. 45, No. 4, Apr. 1997, pp. 707–714.*

Artical entitled "Direction of Arrival Estimation Using Parametric Signal Models", by Ariela Zeira and Benjamin Freidlande, IEEE Transactions On Signal Processing, vol. 44, No. 2, Feb. 1996.*

Pascale, M., *Adaptive Beam Forming*, www.ewh.ieee.org/r2/baltimore/Chapter/Comm/adapt/index.htm, (Jan. 18, 2002).

* cited by examiner

ALL DIGITAL PHASED ARRAY USING SPACE/TIME CASCADED PROCESSING

BACKGROUND OF THE INVENTION

1. Technical Field

The invention concerns phased array systems and more particularly a wide-band all-digital architecture for a phased array system that is capable of operating at high data rates.

2. Description of the Related Art

Phased array antenna systems create directional antenna beams by controlling phase and amplitude relationships (RF weighting) among a plurality of antenna elements that are typically arranged in a line or matrix pattern. Analog implementations of phased arrays have been used for many years in a wide variety of applications. These analog systems commonly make use of digital circuitry for baseband signal processing and control, but rely upon analog circuitry in the front-end RF stages to handle functions such as band pass filtering, and RF weighting of antenna elements.

Although analog phased array systems have many advantages over conventional fixed beam antenna systems, they also suffer from a number of disadvantages. For example, analog phased array systems are typically limited in the number of beams and nulls that can be formed. This is an important consideration for spatially differentiating multiple targets, tracking moving signal sources, or eliminating multiple jammers. With conventional analog phased array systems, the addition of more beams or nulls typically requires changes at the hardware and software level. These systems also tend to be RF unique in that each unit must be individually adjusted to compensate for differences in phase and amplitude in the RF circuitry from unit to unit. These problems are compounded by the inherent expense associated with analog RF systems.

All-digital phased array designs have long been considered desirable because they have the potential to overcome many of the problems of analog systems. Such systems can produce a nearly unlimited number of beams, are easily provided with additional beam-forming capability through software upgrades, have the ability to provide multiple nulls in the antenna pattern to thwart multiple jammers and can provide precise angle of arrival information. Such all-digital phased array systems also have the potential to provide a significant cost reduction as compared to analog systems.

Despite the clear advantages offered by the all-digital phased array, these systems have generally been considered impractical for wide band systems that operate at high data rates. This has primarily been due to limitations of existing technology. Systems using conventional covariance matrix techniques, a large number of array elements and high data rate signals, require many gigaflops of data to be processed. This limits the practicality of digital arrays to low data rates. In general, Analog to Digital converters (A/D's), Application Specific Integrated Circuits (ASICS), and Digital Signal Processors (DSP's) simply have not been available to meet the demands of an all-digital phased array operating in such an environment.

As with any complex system, there are a variety of architectural and processing options that can be adopted for implementing a digital phased array. However, one difficulty that has been confronted in this area is the selection of an appropriate architecture that can be combined with existing component technology that will permit the realization of a true all-digital phased array. Accordingly, a challenge remains to develop an all-digital phased array capable of operating at high frequency, wide bandwidth and high data rates using available component technology.

Notably, adaptive phased arrays are often used to form simultaneous multiple beams pointed toward desired signals and simultaneous multiple nulls pointed toward undesired signals. A typical system application might include reception and transmission of signals from/to multiple satellites or multiple airborne vehicles. In adaptive arrays where the number of elements is large, for example 100's or 1000's, the potential number of adaptive loops is very large—typically equal to N−1 where N is the number of elements in the array. The effective number of loops may be reduced by dynamic range effects, polarization rotation, element pattern, multipath and array shadowing (etc.) effects, however, there are typically many more adaptive loops than required in practice.

For example, in a typical communications scenario there may be one to four desired signals and a few interfering signals. If all of the elements are utilized in deriving a covariance matrix for weight control, the processing for digital versions of the arrays and the hardware for analog versions of the array is prohibitive or, at least, not affordable for the reasons outlined above. The fundamental issue is to selectively control the type and number of weights utilized so as to optimize the array performance in a given real world environment. The objective of this invention is to fulfill this need via intelligent control of cascaded processing that greatly simplifies both the adaptive weighting and control.

SUMMARY OF THE INVENTION

The invention concerns a method and apparatus for cascaded processing of signals in a phased array antenna system in which a plurality of antenna elements are configured as a plurality of sub-arrays. The method is designed to more effectively make use of available received signals to reduce interference from at least one undesired signal.

The process can begin by selectively applying a weighting factor to each of the antenna elements to form a plurality of sub-array beams, each pointed in a selected direction. The weighting factor can be selected exclusively amplitude, exclusively phase, time-delay or complex (phase and amplitude) weights associated with each the antenna element.

For each sub-array, an output from each antenna element in the sub-array can be combined to produce a sub-array output signal. Subsequently, the sub-array output signals can be selectively weighted and combined. In particular, the sub-array output signal received from one of the sub-arrays can be combined with a sub-array output signal from a second one of the sub-arrays in a fully adaptive process.

Subsequently, the system can estimate an angle-of-arrival direction for a signal-of-interest ("SOI") and at least one signal-not-of-interest ("SNOI"). The estimating step as described herein can also include estimating an incident power for at least one of the SOI and the at least one SNOI. The estimating can be based on blind source separation (BSS) techniques, a priori knowledge, or direction information of signals learned during system operation.

Based on this estimating step, the system can calculate a new set of weighting factors for controlling one or more of the sub-array beams to improve the signal-to-noise plus interference ratio obtained for the SOI in the array output signal. The calculating step can include calculating a surrogate covariance matrix based solution for at least one of the sub-arrays. This new set of weighting factors is used to selectively control the weighting factors for the one or more sub-array beams. Adjusting the weighting factors for the sub-arrays can result in re-pointing the sub-array beams, and the production of sub-array beam patterns comprising regions of relatively higher and lower gain. In either case, the intent is to improve the signal-to-noise plus interference ratio.

According to a further embodiment, the system can selectively apply one or more alternate weighting factors to each of the antenna elements in one or more of the sub-arrays. The alternate weighting factors are used to independently form alternate sub-array beams using the antenna elements. An output from each of the antenna elements using the alternate weighting factor can be combined to produce one or more alternate sub-array output signals. Selectively weighting and combining one or more of the sub-array output signals with the alternate sub-array output signals in a fully adaptive process can then further improve the signal-to-noise plus interference ratio.

The invention can further include estimating an angle-of-arrival direction for a second SOI and one or more SNOI. A new set of weighting factors can be calculated for controlling the alternate sub-array beams to improve a second signal-to-noise plus interference ratio obtained for the SOI in the alternate array output signal.

DETAILED DESCRIPTION OF THE PREFERRED EMBODIMENTS

Conventional Digital Beam Forming (DBF) array architectures can range from those using RF weighting and in-parallel digital processing to a full-up all-digital array. The present invention concerns a hybrid variant of these and a processing methodology that could be implemented to achieve wide bandwidth all-digital operations for high data rate systems.

According to one aspect of the invention, digital processing complexity can be addressed via modular sub-arrays and cascaded processing. In particular, cascaded processing can be utilized in which first stage beam space processing and second stage fine beam and null steering can achieve wide dynamic range with a fraction of complexity as compared to direct inversion of N x N matrices. The invention also minimizes analog to digital converter (A/D) performance requirements, thereby overcoming a limiting factor in the present state of the art high bandwidth DBF systems.

Figure 1:
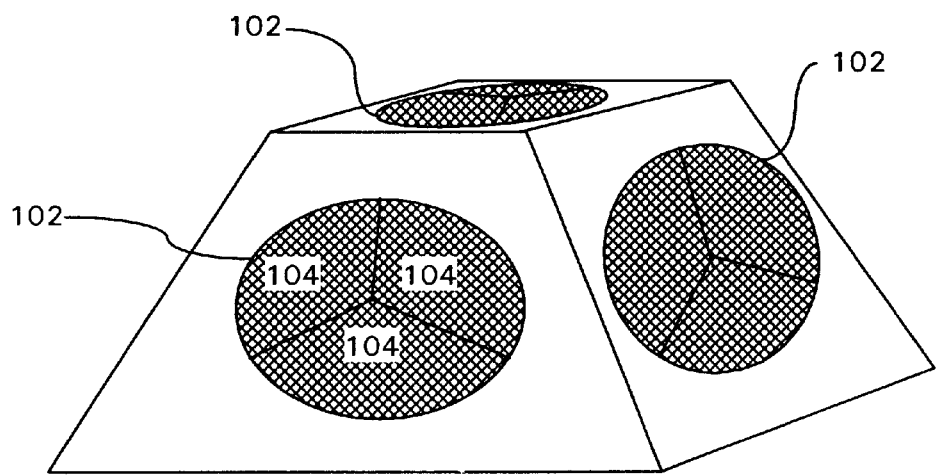
FIG. 1 is a drawing useful for illustrating phased array face configurations.

FIG. 1 shows a set of array faces 102. Each of the array faces 102 can be comprised of a large number of individual antenna elements. For example, a typical array face 102 can have 1024 antenna elements. Each of the array faces 102 will have a limited field of view in a direction roughly orthogonal to the surface of the face. For example, each array face can have a field of view of approximately 120 degrees. Accordingly, the array faces 102 can be arranged in several different directions to facilitate hemispherical or near hemispherical field of view when the faces are operated in combination with one another. In FIG. 1, the array faces 102 are arranged in the form of a truncated pyramid for a total of five array faces. However, those skilled in the art will appreciate that the invention is not limited in this regard. For example, the faces can be arranged in a cubical formation, conformal to an exterior surface of vehicle, such as an aircraft, or distributed among several different locations aboard a vessel as may be dictated by the circumstances of a particular installation.

In the phased array antenna system of FIG. 1, the antenna element contained on each array face 102 can be divided into a plurality of arrays 104. The arrays 104 can be further divided to form a plurality of sub-arrays 106 (not shown in FIG. 1). However, the invention is not limited in this regard and, for smaller arrays, each array face 102 could form a single array or sub-array including all of the elements on the array face.

Figure 2:
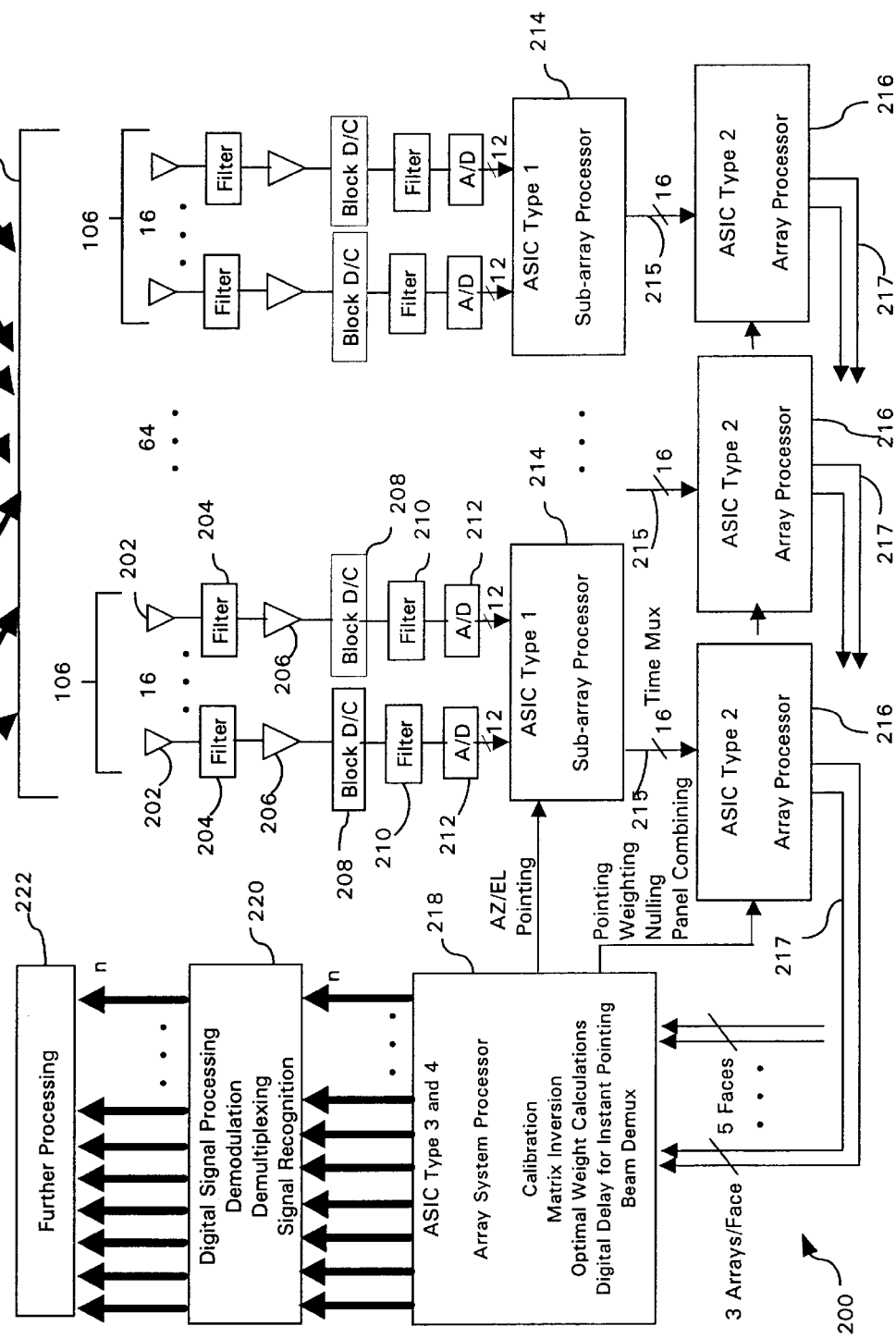
FIG. 2 is a block diagram that is useful for illustrating the cascaded processing according to the inventive arrangements.

FIG. 2 is an exemplary block diagram that is useful for illustrating a preferred architecture by which the present invention can be implemented. For this block diagram, it shall be assumed that each array panel 102 is divided into three arrays 104, and that each array 104 is divided into 64 sub-arrays 106. Each sub-array 106 is comprised of 16 antenna elements 202. For greater clarity, only one of the 16 sub-arrays 106 for a particular array is shown in FIG. 2. It should be understood that other architectures are also possible and the invention is not so limited.

Referring now to FIG. 2, it can be seen that RF signals 203 (plus noise and interference signals) arrive from free space, incident on a radome of an array 104. In each sub-array 106, RF signals 203 are received by antenna elements 202. These signals can be processed in bandpass filter 204 to remove any unwanted out of band signals. The signals can then be passed to low noise amplifier 206. Depending on the frequency band of interest and the frequency limitations of the A/D converter 212, a block frequency down converter 208 can optionally be provided to convert the received RF signals to an intermediate frequency (IF). In that case, further IF filtering can be provided in filter 210, before the signal is passed to A/D converter 212.

Performance requirements for A/D converter 212 represent a limiting factor. Assuming a 10 Mbps data rate, and a 100 Mhz bandwidth for received signals, it is preferred that A/D converter be of very high speed and wide dynamic range. Current state of the art is 12-bit output, approximately 200 Mhz data sampling rate, and about 80 db of dynamic range.

The digital output of A/D converters 212 is passed to a digital sub-array processor 214. Each sub-array processor 212 is preferably comprised of an application specific integrated circuit (ASIC), but the invention is not so limited. As shown in FIG. 2, digital sub-array level processing can be performed in parallel by sub-array processors 214. More specifically, each sub-array processor 214 can concurrently process RF signals for a selected sub-arrray 106. According to a preferred embodiment, each sub-array processor 214 can receive and respond to control inputs from array system processor 218 for beam control. According to an alternative embodiment, not shown, the A/D converter can be located at the output of the sub-array processor. In that case, it will be understood that the sub-array processor will manipulate the incoming signals in the analog domain rather than the digital domain.

The sub-array processors 214 have four basic functions. For each sub-array 106, the associated sub-array processor can (1) perform digital filtering of unwanted signals received by each antenna element 202, (2) selectively apply a weighting factor to each of the RF signals received by each element 202 of the associated sub-array 106, (3) digitally add the received RF signals from each antenna element 202 to produce a sub-array beam summation, and (4) perform time division beam multiplexing for each beam associated with a sub-array 106.

Beam multiplexing as that term is used herein can refer to time multiplexing the digital data stream for the several beams generated by the sub-array processor so that the data stream may be transported through a single output port.

The multiplexed sub-array beam summation output from each sub-array processor 214 is preferably communicated via a time multiplex bus 215 to an array processor 216. Those skilled in the art will appreciate that the precise sequence and protocol adopted for the time multiplexing is not critical. Instead, any suitable time multiplexing arrangement can be used for transporting the digital data from the sub-array processor 214 to the array processors 216.

Each array processor 216 preferably receives sub-array beam summation output data from a plurality of sub-array processors 214 associated with a particular array 104. In the present case, since there are 64 sub-arrays 106 comprising the array 104. The array processors 216 can preferably receive input control signals from the array system processor 218 for beam pointing, element weighting, nulling signals from interference sources, and for combining sub-arrays 106 associated with an array 104. The array processors 216 apply sub-array weighting factors to sub-array beam summations to effectively control beam pointing and nulling for each array 104. The array processors 216 also preferably add the sub-array beam summations from the plurality of sub-arrays to produce a beam summation for each array 104.

The beam summation data for each of the arrays 104 can be communicated from the array processor 216 to array system processor 218. The array system processors 216 for each array 104 are configured for weighting and combining the sub-array beam summation signals forming each sub-array in a fully adaptive process. A time division multiplex bus 217 can be used for facilitating communications between the array processor 216 and array system processor 218. The array system processor performs system level processing on the digital beam data provided by each of the array processors. For example, the array system processor can perform calibration, matrix inversion processing, optimal weight calculations, digital delay for instant beam pointing, and time demultiplexing of digital beam data. The array system processor also coordinates the operation of each array face 102 so at to combine the limited fields of view offered by each face into a hemispherical or near hemispherical field of view. The output digital data from array system processor 218 is communicated to digital signal processor (DSP) 220 for demodulation of received signals, demultiplexing, and signal recognition. Any further processing required for specific system user applications can be performed in block 222.

Figure 3:
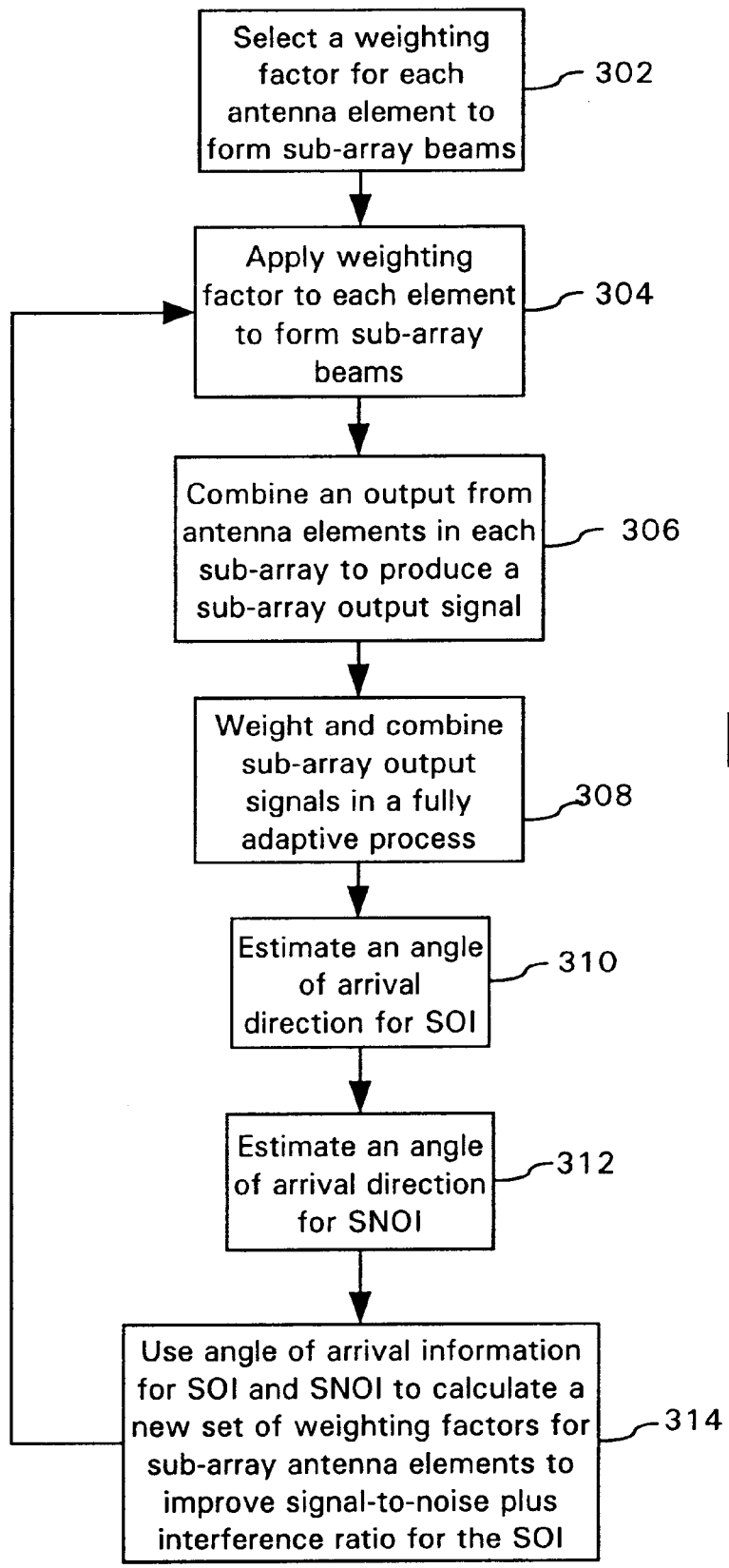
FIG. 3 is a flow chart useful for illustrating cascaded processing according to the inventive arrangements.

FIG. 3 is a flow chart that is useful for illustrating a preferred method for cascaded processing of signals received by the sub-arrays as described in FIGS. 1 and 2. The method is intended to maximize a signal to noise ratio for a received signal of interest (SOI) while simultaneously reducing interference from at least one undesired signal, referred to herein as a signal not-of-interest (SNOI). In general, this will have the desired effect of producing a maximum signal to noise plus interference ratio.

In FIG. 3, the process can begin in step 302 by applying a weighting factor to each of the antenna elements 202 in each sub-array 106. The weighting factors are used to form for each sub-array a plurality of sub-array beams, each pointed in a selected direction. As a starting point, the sub-array beams can be pointed in a set of default directions. Alternatively the process can begin with the sub-array beams pointed in selected directions based on some a priori knowledge as to the location of one or more known SOI and/or SNOI.

In step 304, appropriate weighting factors are applied to each sub-array antenna element 202 to form a set of sub-array beams. The weighting factors can be based on any of a variety of known techniques used for beam formation. For example, the weighting factor can be exclusively analog, exclusively phase, exclusively time delay or complex. The weighting factors can be applied to incoming signals using any suitable analog or digital means. For example, in FIG. 2, digital weighting can be performed digitally within sub-array processor 214. In step 306, the sub-array processor 214 can combine an output from each of the antenna elements 202 in the sub-array 106 to produce a sub-array output signal 215. The sub-array output signal 215 is a summation of the signals produced by the 16 sub-arrays.

In step 308, each array processor 216 can selectively weight and combine the sub-array output signals received from the 64 sub-arrays in a fully adaptive process controlled by array system processor 218. The resulting array output signal 217 of the array processor 216 will include an array output signal having a signal-to-noise plus interference ratio for the SOI. This signal-to-noise-plus interference ratio is based, at least in part, on the default weighting of the sub-array beams.

In step 310 and 312, the array system processor can begin the process of improving the signal-to-noise plus interference ration by first estimating an angle-of-arrival direction for an SOI and at least one SNOI, if present. For example, this process can be performed using blind source separation (BSS) techniques or direction information for signals as learned during system operation. The estimating step can also preferably include estimating an incident power for the SOI, the SNOI or both.

In step 314, responsive to the estimating step, the array system processor can calculate a new set of weighting factors for controlling the 64 sub-arrays. The new set of weighting factors are calculated so as to improve the signal-to-noise plus interference ratio obtained for the SOI in the array output signal 217. This process can be performed using conventional adaptive processing techniques. For example, the array system processor 218 can calculate a surrogate covariance matrix based solution for each of the sub-arrays.

Subsequently, in step 204, the array system processor 218 can use the calculated information to selectively control the weighting factors for each antenna element 202 in each sub-array 106. For example, the weighting factors can be adjusted for re-pointing the sub-array beam, or to produce a sub-array beam pattern comprising regions of relatively higher and lower gain. In either case, the intention is to improve the signal-to-noise plus interference ratio for the SOI at the array output 217. By using the foregoing technique, the system can substantially reduce the processing demands normally placed upon an adaptive array.

Alternate sub-array beams are commonly produced by many phased array systems for receiving signals from one or more additional SOI. These alternate sub-array beams can be used to further enhance the processing advantages obtained with the present invention. Alternate sub-array beams for additional SOI's are typically formed using the same sub-arrays 106 as described above, but independently applying a separate set of weighting factors. In some instances, these alternate sub-array beams can provide an improved set of signals upon which adaptive processing can be performed.

Figure 4:
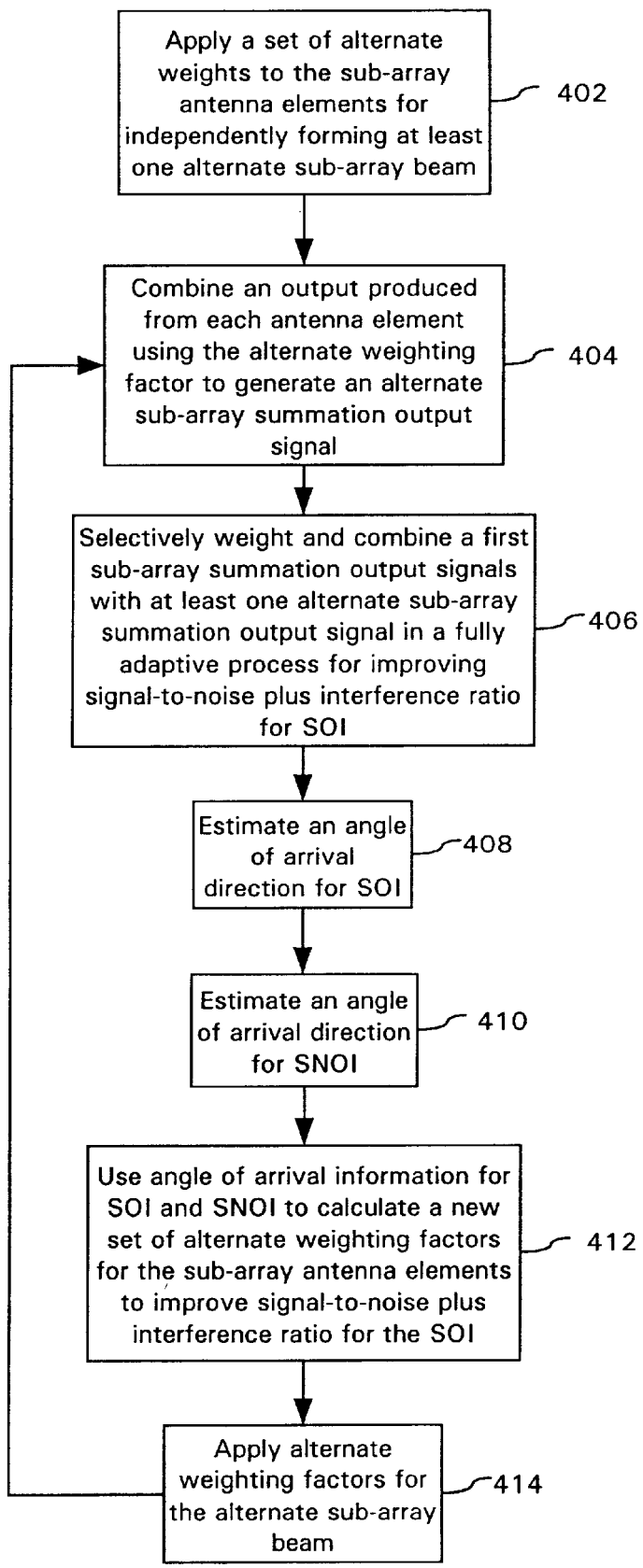
FIG. 4 is a flow chart useful for illustrating cascaded processing using alternate weighting factors.

Referring now to FIG. 4, the process according to a preferred embodiment can continue in step 402 with the application of an alternate set of weights to at least one set of sub-array antenna elements. These alternate weights can initially be based on default settings or based on a priori information available to the system. Using these preliminary alternate weights it is possible to independently form at least one alternate sub-array beam using sub-arrays 106. In practice, all of the sub-array processors 214 can apply alternate weights to all of the sub-arrays, however it should be understood that the invention is not so limited.

In step 404, the outputs from each antenna element 202 obtained using the preliminary alternate sub-array weights can be combined in a summation to form at least one alternate sub-array output signal. This alternate sub-array output signal can be provided to an array processor 216 as shown in FIG. 2. In step 406, the first set of sub-array output signals can be weighted and combined in the array processor with one or more alternate sub-array output signals. The appropriate weighting for each of the alternate sub-array outputs can be computed in a fully adaptive process handled by the array system processor 218. With this process, it is possible to potentially obtain some further improvements to the signal-to-noise plus interference ratio for the SOI as compared to that attainable without using the alternate beams.

In steps 408 and 410, the system can estimate an angle of arrival for the SOI and SNOI. The estimating step can also include estimating an incident power level for these signals. In any case, this estimated information can be used in step 412 to calculate a new set of alternate sub-array beam weighting factors to further improve the signal-to-noise plus interference ratio for the SOI. In step 414, these new alternate sub-array weighting factors can be applied to sub-arrays 106 in step 414. Thereafter, the system can loop back to step 404, generating alternate sub-array summation output signals using the new alternate sub-array summation output signal. Finally in step 406, the system can further improve the signal to noise plus interference ratio for the SOI in step 406 using a fully adaptive process.

Using similar techniques to those described in FIG. 3, the alternate sub-array output signals from a first set of the sub-arrays can be weighted and combined with a second set of alternate sub-array output signal from a second set of sub-arrays to improve the signal-to-noise plus interference ratio for a second SOI.

We claim:

1. In a phased array antenna system having a plurality of antenna elements configured as a plurality of sub-arrays, a method for cascaded processing of signals to reduce interference from at least one undesired signal, comprising the steps of:
    selectively applying a weighting factor to each of said antenna elements to form a plurality of sub-array beams, each pointed in a selected direction;
    for each said sub-array combining an output from each said antenna element in said sub-array to produce a single sub-array output signal;
    selectively weighting and combining said sub-array output signal received from at least one of said sub-arrays with a sub-array output signal from at least a second one of said sub-arrays in a fully adaptive process performed at an array level for producing an array output signal having a signal-to-noise plus interference ratio;
    estimating an angle-of-arrival direction for a signal of interest SOI and at least one signal not of interest SNOI;
    responsive to said estimating step, calculating a new set of weighting factors for controlling at least one said sub-array beam to improve said signal to-noise plus interference ratio obtained for said SOI in said array output signal; and
    selectively controlling said weighting factors for said at least one sub-array beam in accordance with said calculating step.

2. The method according to claim 1 wherein said controlling step comprises adjusting said weighting factors for at least one of said sub-arrays for re-pointing said sub-array beam.

3. The method according to claim 1 wherein said controlling step comprises adjusting said weighting factors for at least one of said sub-arrays to produce a sub-array beam pattern comprising regions of relatively higher and lower gain to improve said signal-to-noise plus interference ratio.

4. The method according to claim 3 wherein said calculating step is further comprised of calculating a covariance matrix based solution for at least one of said sub-arrays.

5. The method according to claim 1 wherein said weighting factor is selected from the group consisting of exclusively amplitude, exclusively phase, time-delay and complex weights associated with each said antenna element.

6. The method according to claim 1 wherein said estimating step further comprises the step of estimating an incident power for at least one of said SOI and said at least one SNOI.

7. The method according to claim 1 wherein said selected direction in which at least one sub-array is initially pointed is a region of angular space expected to contain said SOI.

8. The method according to claim 1 wherein said estimating step further comprises a direction finding method based on at least one of:
    blind source separation (BSS) techniques;
    a priori knowledge;
    direction information of signals learned during system operation.

9. The method according to claim 1 further comprising the steps of:
    selectively applying at least one alternate weighting factor to each of said antenna elements in at least one of said sub-arrays to independently form at least one alternate sub-array beam using said antenna elements; and
    combining an output from each said antenna element produced using said alternate weighting factor to produce at least one alternate sub-array output signal; and
    selectively weighting and combining at least one of said sub-array output signals with said at least one alternate sub-array output signal in a fully adaptive process for improving said signal-to-noise plus interference ratio.

10. The method according to claim 9 further comprising selectively weighting and combining said at least one alternate sub-array output signal from a first one of said sub-arrays with a second alternate sub-army output signal from at least a second one of said sub-arrays in a fully adaptive process for producing an alternate array output signal having a second signal-to-noise plus interference ratio.

11. The method according to claim 10 further comprising the step of estimating an angle-of-arrival direction for a second SOI and at least one said SNOI.

12. The method according to claim 11 further comprising the step of calculating a new set of weighting factors for controlling at least one said alternate sub-array beam to improve said second signal to-noise plus interference ratio obtained for said SOI in said alternate array output signal.

13. The method according to claim 12 further comprising the step of selectively controlling said alternate weighting factors for said at least one alternate sub-array beam in accordance with said calculating step.

14. In a phased array antenna system having a plurality of antenna elements configured as a plurality of sub-arrays, a system for cascaded processing of signals to reduce interference from at least one undesired signal, comprising:

a plurality of sub-army processors for selectively applying a weighting factor to each of said antenna elements to form a plurality of sub-array beams, each pointed in a selected direction, and for combining an output from each said antenna element in said sub-arrays to produce a single sub-array output signal for each said sub-array;

at least one array processor for selectively weighting and combining said sub-array output signals received from at least a first one of said sub-arrays with a sub-array output signal from at least a second one of said sub-arrays in a fully adaptive process performed at an array level for producing an array output signal having a signal-to-noise plus interference ratio;

an array system processor for estimating an angle-of-arrival direction for a signal of interest SOI and at least one signal not of interest SNOI and, calculating a new set of weighting factors based on said estimated angle-of-arrival direction information for controlling at least one said sub-array beam to improve said signal to-noise plus interference ratio obtained for said SOI in said array output signal; and control circuitry for selectively controlling said weighting factors for said at least one sub-array beam for applying said new set of weighting factors.

15. The system according to claim 14 wherein said controlling circuitry is responsive to array system processor for adjusting said weighting factors for at least one of said sub-arrays for re-pointing said sub-array beam.

16. The system according to claim 14 wherein said control circuitry is responsive to said array system processor for adjusting said weighting factors for at least one of said sub-arrays to produce a sub-array beam pattern comprising regions of relatively higher and lower gain to improve said signal-to-noise plus interference ratio.

17. The system according to claim 16 wherein said array system processor is configured for calculating a covariance matrix based solution for at least one of said sub-arrays.

18. The system according to claim 14 wherein said weighting factor is selected from the group consisting of exclusively amplitude, exclusively phase, time-delay and complex weights associated with each said antenna element.

19. The system according to claim 14 wherein said array system processor estimates an incident power for at least one of said SOI and said at least one SNOI.

20. The system according to claim 14 wherein said sub-array processor is responsive to said array-system-processor for initially pointing at least one said sub-array toward a region of angular space expected to contain said SOI.

21. The system according to claim 14 wherein said array system processor estimates an angle-of-arrival direction for said SOI and said at least one SNOI based on at least one of:

blind source separation (BSS) techniques;

a priori knowledge;

direction information of signals learned during system operation.

22. The system according to claim 14 wherein at least one said sub-array processor selectively applies at least one alternate weighting factor to each of said antenna elements in at least one of said sub-arrays to independently form at least one alternate sub-array beam using said antenna elements.

23. The system according to claim 22 wherein said at least one sub-array processor combines an output from each said antenna element produced using said alternate weighting factor to produce at least one alternate sub-army output signal.

24. The system according to claim 23 wherein said array processor selectively weights and combines at least one of said sub-array output signals with said at least one alternate sub-array output signal in a fully adaptive process for improving said signal-to-noise plus interference ratio.

25. The system according to claim 24 wherein said array processor selectively weights and combines said at least one alternate sub-array output signal from a first one of said sub-arrays with a second alternate sub-army output signal from at least a second one of said sub-arrays in a fully adaptive process for producing an alternate array output signal having a second signal-to-noise plus interference ratio.

26. The system according to claim 25 wherein said array system processor further estimates an angle-of-arrival direction for a second SOI and at least one said SNOI.

27. The system according to claim 26 wherein said array system processor calculates a new set of weighting factors for controlling at least one said alternate sub-array beam to improve said second signal to-noise plus interference ratio obtained for said SOI in said alternate army output signal.

28. The system according to claim 27 wherein said array system processor selectively controls said alternate weighting factors for said at least one alternate sub-array beam based on said new set of weighting factors.

* * * * *

UNITED STATES PATENT AND TRADEMARK OFFICE
CERTIFICATE OF CORRECTION

PATENT NO.    : 6,738,018 B2
DATED         : May 18, 2004
INVENTOR(S)   : Phelan et al.

It is certified that error appears in the above-identified patent and that said Letters Patent is hereby corrected as shown below:

Column 10,
Line 49, delete "army" and replace with -- array --.

Signed and Sealed this

Fourth Day of January, 2005

JON W. DUDAS
*Director of the United States Patent and Trademark Office*